United States Patent
Sun et al.

(10) Patent No.: US 9,210,037 B2
(45) Date of Patent: Dec. 8, 2015

(54) METHOD, APPARATUS AND SYSTEM FOR INTERCONNECTED RING PROTECTION

(71) Applicant: Huawei Technologies Co., Ltd., Shenzhen, Guangdong (CN)

(72) Inventors: Guanghui Sun, Shenzhen (CN); Qianfeng Xu, Shenzhen (CN); Yinghai He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 166 days.

(21) Appl. No.: 13/755,733

(22) Filed: Jan. 31, 2013

(65) Prior Publication Data

US 2013/0194913 A1    Aug. 1, 2013

(30) Foreign Application Priority Data

Jan. 31, 2012    (CN) .......................... 2012 1 0021842

(51) Int. Cl.
*H04L 12/24*    (2006.01)
*H04L 12/703*   (2013.01)
*H04L 12/437*   (2006.01)
*H04L 12/46*    (2006.01)
(Continued)

(52) U.S. Cl.
CPC ......... *H04L 41/0654* (2013.01); *H04J 14/0283* (2013.01); *H04L 12/437* (2013.01); *H04L 12/4637* (2013.01); *H04L 41/0663* (2013.01); *H04L 45/28* (2013.01); *H04Q 11/0062* (2013.01); *H04Q 2011/0077* (2013.01); *H04Q 2011/0081* (2013.01); *H04Q 2011/0092* (2013.01)

(58) Field of Classification Search
None
See application file for complete search history.

(56) References Cited

U.S. PATENT DOCUMENTS 6,721,268 B1 *   4/2004   Ohira et al. .................... 370/223
7,848,340 B2 *  12/2010   Sakauchi et al. ............... 370/406
(Continued)

FOREIGN PATENT DOCUMENTS

| CN | 1893385 A | 1/2007 |
|---|---|---|
| CN | 102035712 A | 4/2011 |

(Continued)

OTHER PUBLICATIONS

Hundessa, L., Pascual, J.D., Fast rerouting mechanism for a protected label switched path, Proceedings of the Tenth International Conference on Computer Communications and Networks, pp. 527-530, 2001.*

(Continued)

*Primary Examiner* — Christopher Crutchfield
(74) *Attorney, Agent, or Firm* — Leydig, Voit & Mayer, Ltd.

(57) ABSTRACT

A method, an apparatus and a system for interconnected ring protection, relates to the communication field, realizes the protection of the interconnected ring network using a narrow bandwidth, and improves the bandwidth utilization rate. The method comprises: a first intersection node in an intersection node group receiving an cross-ring service, the first intersection node determining an off-ring node of the cross-ring service on a second ring according to service information of the cross-ring service; and if the first intersection node does not communicate with the off-ring node of the cross-ring service on the second ring, and the first intersection node is not the last intersection node, the first intersection node forwarding the cross-ring service to a second intersection node.

20 Claims, 10 Drawing Sheets

(51) Int. Cl.
*H04J 14/02* (2006.01)
*H04Q 11/00* (2006.01)

(56) References Cited

U.S. PATENT DOCUMENTS

| | | | |
|---|---|---|---|
| 2003/0026209 A1* | 2/2003 | Katz | 370/238 |
| 2004/0105453 A1* | 6/2004 | Shpak et al. | 370/404 |
| 2005/0094554 A1* | 5/2005 | Nakash | 370/222 |
| 2005/0213558 A1* | 9/2005 | Levit et al. | 370/351 |
| 2005/0265052 A1 | 12/2005 | Utsunomiya | |
| 2005/0265365 A1* | 12/2005 | Wan | 370/401 |
| 2008/0107125 A1* | 5/2008 | Bruckman | 370/405 |
| 2008/0232802 A1* | 9/2008 | Wang | 398/59 |
| 2012/0236710 A1* | 9/2012 | Tochio | 370/228 |
| 2014/0313893 A1* | 10/2014 | Zhang et al. | 370/235 |

FOREIGN PATENT DOCUMENTS

| | | |
|---|---|---|
| CN | 102035714 A | 4/2011 |
| CN | 102148733 A | 8/2011 |
| CN | 102355400 A | 2/2012 |
| CN | 1023355400 | 2/2012 |
| CN | 102387027 A | 3/2012 |
| CN | 102546425 A | 7/2012 |
| JP | 2005020491 A | 1/2005 |
| JP | 2005159546 A | 6/2005 |
| JP | 2006020491 A | 1/2006 |
| JP | 2006148761 A | 6/2006 |
| JP | 2008067244 A | 3/2008 |
| WO | WO 2013013642 A1 | 1/2013 |

OTHER PUBLICATIONS

Author Unknown, Multiprotocol Label Switching (MPLS) on Cisco Routers, pp. 1-17, May 4, 2009.*
"G.8132—T-MPLS Ring Protection," ITU-T Draft Recommendation, Nov. 26-30, 2007, ITU-T, Geneva, Switzerland.
International Search Report in corresponding International Patent Application No. PCT/CN2012/080492 (Dec. 13, 2012).

* cited by examiner

METHOD, APPARATUS AND SYSTEM FOR INTERCONNECTED RING PROTECTION

CROSS-REFERENCE

This application claims priority to Chinese Patent Application No. 201210021842.6, filed on Jan. 31, 2012, which is incorporated herein by reference in its entirety.

FIELD OF THE APPLICATION

The present application relates to the communication field, in particular, relates to a method, an apparatus and a system for interconnected ring protection.

BACKGROUND OF THE APPLICATION

Figure 1:
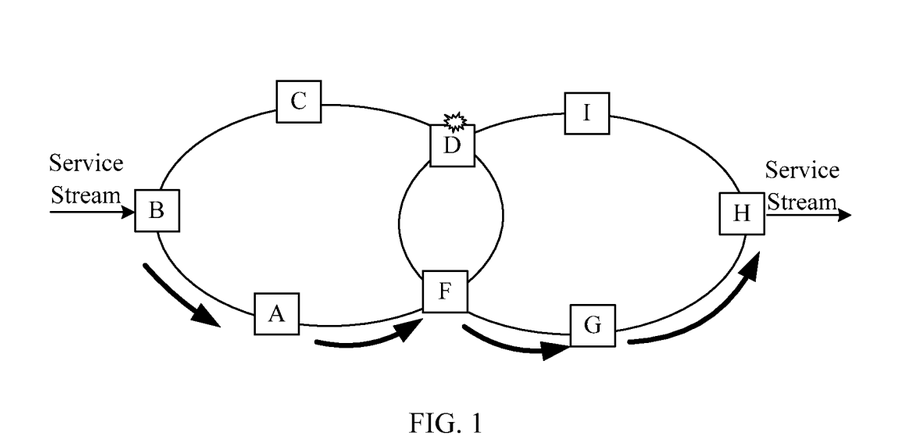
FIG. 1 is a schematic diagram of typical networking of a MPLS interconnected ring.

Multi-protocol label switching (full name in English is: Multi-Protocol Label Switching, hereinafter simply referred to as "MPLS") is a system based on fast data packet switching and routing, which realizes packet service fast forwarding, and provides the network data traffic capabilities such as routing, forwarding, switching and the like. A ring network based on the MPLS technology may be called as a MPLS ring, and a plurality of MPLS rings can intersect on one or more nodes and constitute a network structure of MPLS ring interconnection (hereinafter simply referred to as a "MPLS interconnected ring"), as shown in FIG. 1.

Logic paths for transmitting service streams among individual nodes in a MPLS ring may be implemented based on a label switching path (full name in English is: Label Switching Path, hereinafter simply referred to as LSP). A MPLS ring consists of a MPLS work ring (hereinafter simply referred to as "work ring") and a MPLS protection ring (hereinafter simply referred to as "protection ring"), and the directions of the two rings are opposite each other, taking a direction of a specific service stream as a reference. According to the actual needs, each ring may establish a plurality of logic paths for transmitting service streams and assign different logic paths to different service streams. In practice, the work ring and the protection ring may also be identified with the labels. For example, the work ring or the protection ring may be identified by attaching a layer of label to an outer layer of the label identifying the logic path of the service stream. Thus, the work ring and the protection ring may also be implemented based on LSP.

In order to improve the reliability of transmission, the MPLS interconnected ring may be protected using a manner of service end-to-end automatic protection switching (full name in English is: Automatic Protection Switching, hereinafter simply referred to as APS). As shown in FIG. 1, in a normal state, after entering the MPLS interconnected ring, the service streams are forwarded according to the service labels. In FIG. 1, the work logic path for transmitting the service steams is B→C→D→I→H. If a fault occurs in an intersection node D, an end-to-end APS is triggered, and the service streams will be switched to a protection logic path B→A→F→G→H to be transmitted.

In the MPLS ring protection scheme as described above, it is necessary to assign bandwidths for the work ring of the MPLS ring and the protection ring of the MPLS ring, respectively, so that the protection of faults in the internal of the ring is realized. In the case, the actual bandwidth utilization rate is only 50%. Further, In the MPLS ring protection scheme as described above, in order to realize the end-to-end protection of cross-ring services, the work ring is required to assign the bandwidths for the work logic path and the protection logic path, respectively, on the basis of the bandwidth utilization rate of 50%, and only 25% of the link bandwidth is actually used for transmitting the services, which results in a reduction of the actual bandwidth utilization rate.

SUMMARY

A technical problem to be solved in the present application is to provide an interconnected ring protection method, an interconnected ring protection apparatus and an interconnected ring protection system, which may improve the bandwidth utilization rate.

On one aspect, the present application provides an interconnected ring protection method, comprising: a first intersection node in an intersection node group receiving an cross-ring service, wherein the intersection node group comprises at least the first intersection node and a second intersection node, and the first intersection node and the second intersection node are intersection nodes of a first ring and a second ring; the first intersection node determining an off-ring node of the cross-ring service on the second ring according to service information of the cross-ring service; and if the first intersection node does not communicate with the off-ring node of the cross-ring service on the second ring, and the first intersection node is not the last intersection node, the first intersection node forwarding the cross-ring service to the second intersection node.

In another aspect, the present application provides an interconnected ring protection apparatus, wherein the interconnected ring protection apparatus is an intersection node of a first ring and a second ring, the interconnected ring protection apparatus comprising: a receiving unit, configured to receive an cross-ring service; an off-ring node determining unit, configured to determine an off-ring node of the cross-ring service on the second ring according to service information of the cross-ring service; and a first processing unit, configured to forward the cross-ring service to another intersection node of the first ring and the second ring, when the interconnected ring protection apparatus does not communicate with the off-ring node of the cross-ring service on the second ring, and the interconnected ring protection apparatus is not the last intersection node.

In another aspect, the present application provides an interconnected ring protection system, comprising at least one first interconnected ring protection apparatus and one second interconnected ring protection apparatus. Wherein the first interconnected ring protection apparatus and the second interconnected ring protection apparatus are intersection nodes of a first ring and a second ring, and the second interconnected ring protection apparatus is the last intersection node. Specially, the first interconnected ring protection apparatus is configured to receive an cross-ring service, determine an off-ring node of the cross-ring service on the second ring according to service information of the cross-ring service, forward the cross-ring service to the off-ring node of the cross-ring service on the second ring when the first interconnected ring protection apparatus communicates with the off-ring node of the cross-ring service on the second ring, and forward the cross-ring service to other intersection nodes of the first and second rings when the first interconnected ring protection apparatus does not communicate with the off-ring node of the cross-ring service on the second ring; and the second interconnected ring protection apparatus is configured to receive the cross-ring service from the first interconnected ring protection apparatus, obtain the off-ring node of the cross-ring service on the second ring according to the service information of the cross-ring service, and forward the cross-ring service to the off-ring node of the cross-ring service on the second ring.

By use of the interconnected ring protection method, the interconnected ring protection apparatus and the interconnected ring protection system provided by the present application, the protection of an interconnected ring can be realized without establishing an end-to-end protection tunnel for the cross-ring service, and thereby reserving a protection bandwidth for the protection tunnel, so that the bandwidth utilization rate is improved.

BRIEF DESCRIPTION OF THE DRAWINGS

FIGS. 2-5*b* are flow charts of interconnected ring protection methods provided by the embodiments of the present application;

DETAILED DESCRIPTION OF EMBODIMENTS

Embodiments of the present application will be described in detail below in connection with the drawings. The specific embodiments described herein are only to explain the present application, and are not used to limit the present application.

For the sake of description, in the embodiments of the present application, logic paths for transmitting the service streams are called as "tunnel" (tunnel), the work ring and the protection ring of the MPLS are called as "work channel" (channel) and "protection channel", and the service streams are simply referred to as "services".

Figure 2:
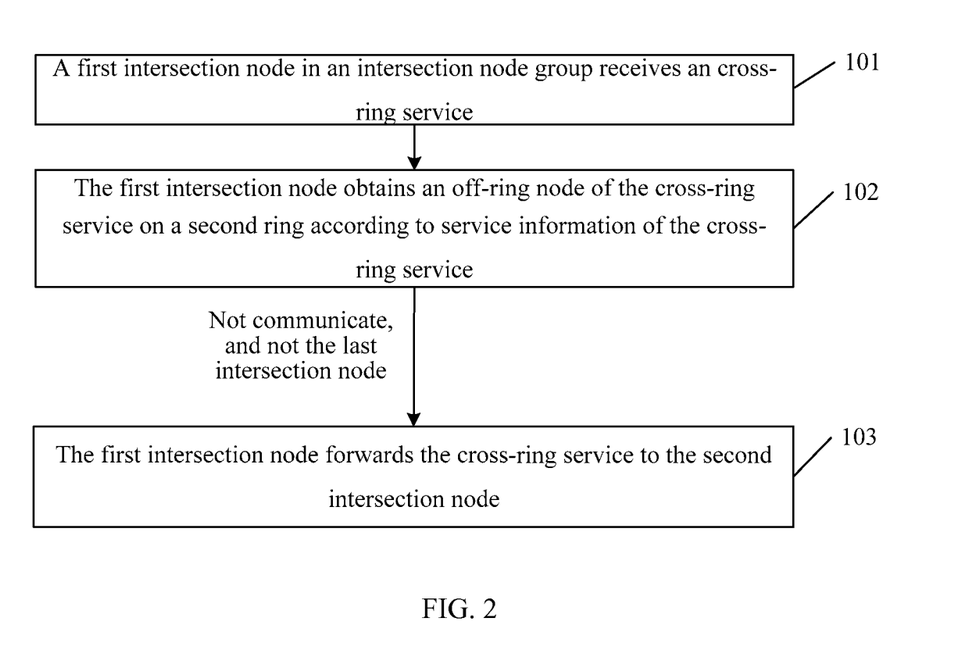

An embodiment of the present application provides an interconnected ring protection method, as shown in FIG. 2, comprising:

101. A first intersection node in an intersection node group receives an cross-ring service, wherein the intersection node group comprises at least the first intersection node and a second intersection node, and the first intersection node and the second intersection node are intersection nodes of a first ring and a second ring.

Optionally, in a representative embodiment, the first ring and the second ring may be MPLS rings. Of course, they may also be rings based on other protocols, such as resilient packet rings (full name in English is: Resilient Packet Ring, hereinafter simply referred to as RPR), and are not defined by the embodiments of the application.

Figure 6:
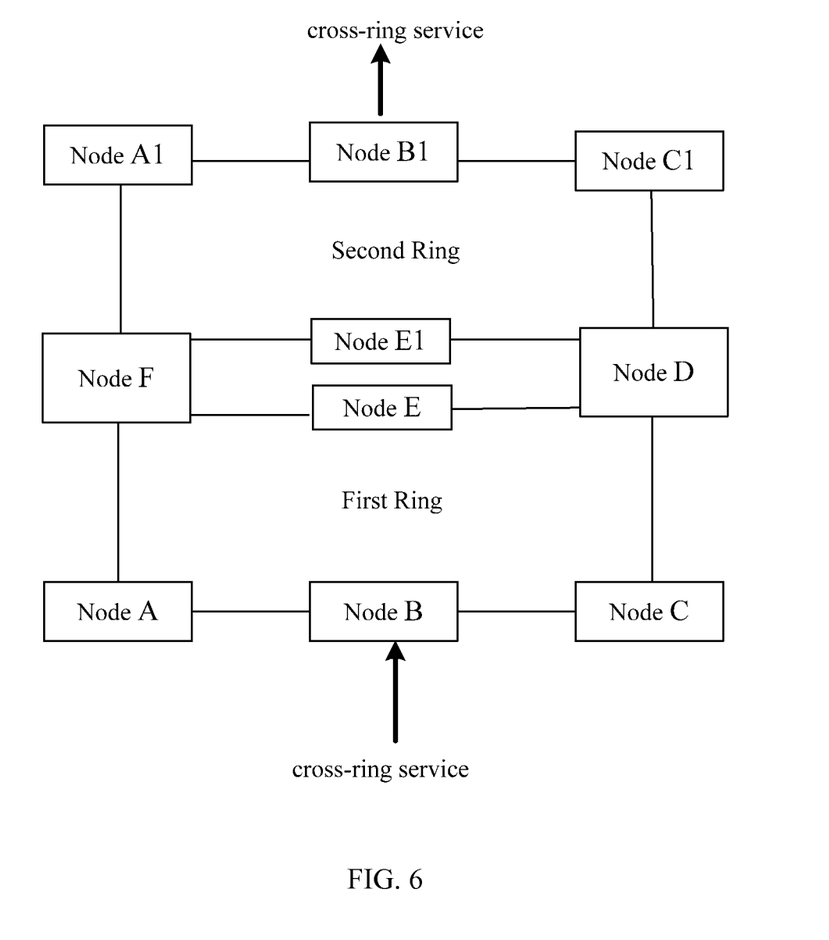
FIGS. 6-9 are schematic diagrams of applications scenarios of the interconnected ring protection methods provided by the embodiments of the present application.

Optionally, the intersection of the first ring and the second ring in the present embodiment means that the first ring and the second ring have at least two intersection nodes. For example, as shown in FIG. 6, the first ring and the second ring have two intersection nodes.

The cross-ring service described in the present embodiment refers to a service transmitted toward the second ring via the first ring, which may be a service entering the first ring from a certain node in the first ring, with the destination address being on the second ring, or a service entering the first ring from a certain node in the first ring, passing through the second ring, and then being transmitted toward other rings (such as a third ring), for example.

102. The first intersection node determines an off-ring node of the cross-ring service on the second ring according to service information of the cross-ring service.

Optionally, the first intersection node in the intersection node group may check an incoming label of the cross-ring service after receiving the cross-ring service, and determine the off-ring node of the cross-ring service on the second ring. As shown in FIG. 6, a first intersection node F determines that the off-ring node of the cross-ring service on the second ring is a node B1, by checking the incoming label of the cross-ring service.

Optionally, the off-ring node of the cross-ring service on the second ring may be a destination node of the cross-ring service on the second ring, or a node of the cross-ring service departing from the second ring.

For example, if the destination address of the cross-ring service is an address of a certain node on the second ring, the node will be the off-ring node of the cross-ring service on the second ring. If the cross-ring service needs to pass through the second ring and then be transmitted toward a third ring, the off-ring node of the cross-ring service on the second ring is a node of the cross-ring service departing from the second ring.

In a practical application, the node of the cross-ring service departing from the second ring belongs to an intersection node group of the second ring and the third ring. In an optional implementation of the present application, the intersection node group may be considered as a virtual intersection node, and the cross-ring service may depart from the second ring on any one intersection node in the intersection node group of the second and third rings.

103. If the first intersection node does not communicate with the off-ring node of the cross-ring service on the second ring, and the first intersection node is not the last intersection node, the first intersection node forwards the cross-ring service to the second intersection node (for the sake of simplification, "Not communication" and "Not the last intersection node" is shown in the figure).

Here, the first intersection node not communicating with the off-ring node of the cross-ring service on the second ring means that the cross-ring service starts from the first intersection node and is not able to reach the off-ring node of the cross-ring service on the second ring. Optionally, the cross-ring service not being able to reach the off-ring node of the cross-ring service on the second ring means that the cross-ring service cannot reach the off-ring node of the cross-ring service on the second ring along either of the work channel and the protection channel.

Optionally, when the off-ring node belongs to the intersection node group of the second ring and the third ring, the cross-ring service not being able to reach the off-ring node of the cross-ring service on the second ring specifically means that the cross-ring service cannot reach all intersection nodes in the intersection node group of the second ring and the third ring.

In the embodiment of the present application, the last intersection node refers to one intersection node in the intersection node group of the first ring and the second ring, which lastly receives the cross-ring service.

Figure 3:
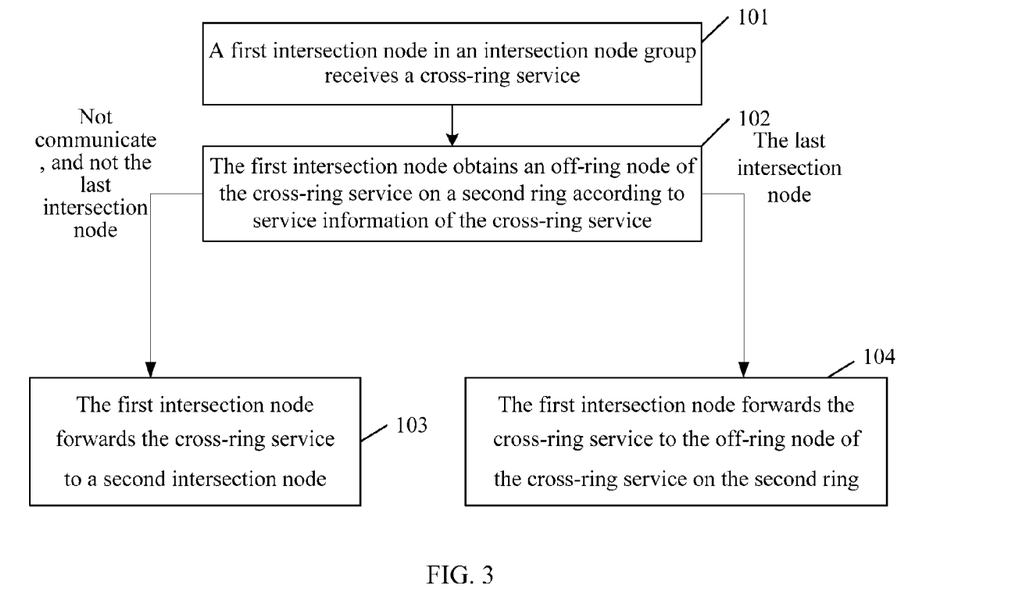

Optionally, as shown in FIG. 3, in another embodiment of the present application, an interconnected ring protection method may further comprise:

104. If the first intersection node is the last intersection node, the first intersection node forwards the cross-ring service to the off-ring node of the cross-ring service on the second ring. (For the sake of simplification, "the last intersection node" is shown in the figure.)

Optionally, the above 104 may be implemented in such a manner that if the first intersection node is the last intersection node, and the first intersection node does not communicate with the off-ring node of the cross-ring service on the second ring, the first intersection node forwards the cross-ring service to the off-ring node of the cross-ring service on the second ring.

In this embodiment, regardless of whether the first intersection node communicating with the off-ring node of the cross-ring service on the second ring or not, the cross-ring service may be sent out by the last intersection node. In the case, it does not need to consider whether the cross-ring service finally can reach the off-ring node on the second ring.

Figure 4:
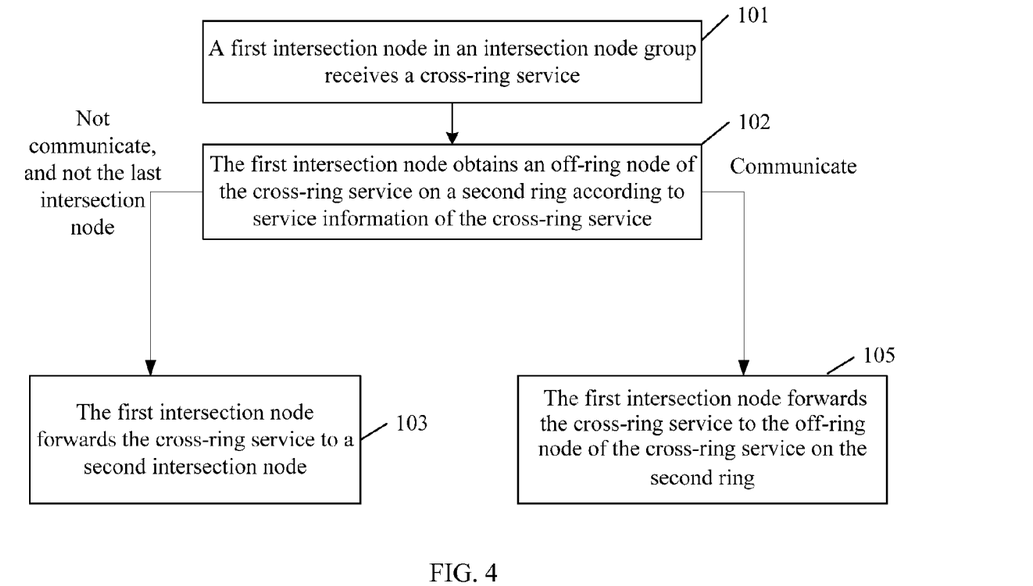

Optionally, as shown in FIG. 4, in another embodiment of the present application, the method may further comprises:

105. If the first intersection node communicates with the off-ring node of the cross-ring service on the second ring, the first intersection node forwards the cross-ring service to the off-ring node of the cross-ring service on the second ring. (For the sake of simplification, "communicate" is shown in the figure.)

In this embodiment, it is not necessary to consider whether the first intersection node is the last intersection node or not.

Figure 5A:
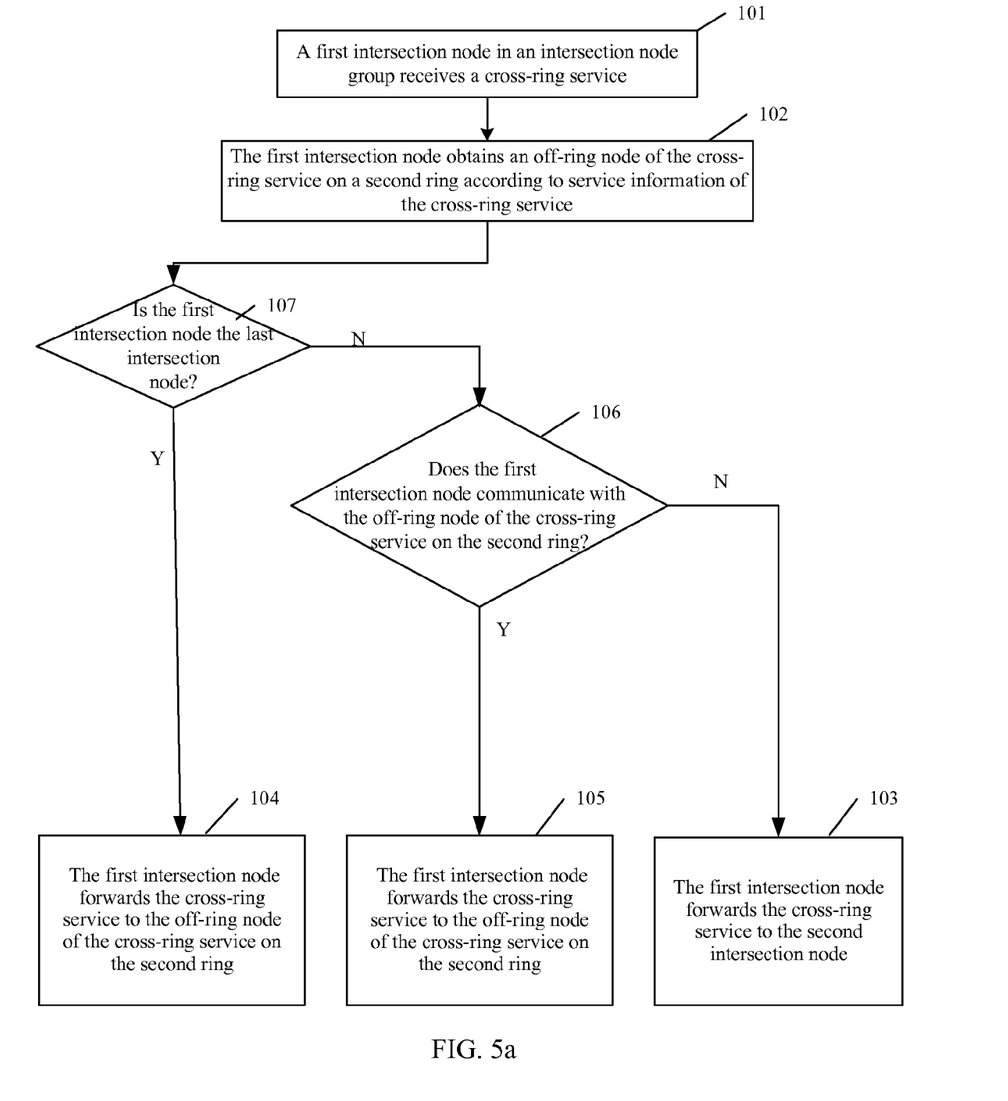
Figure 5B:
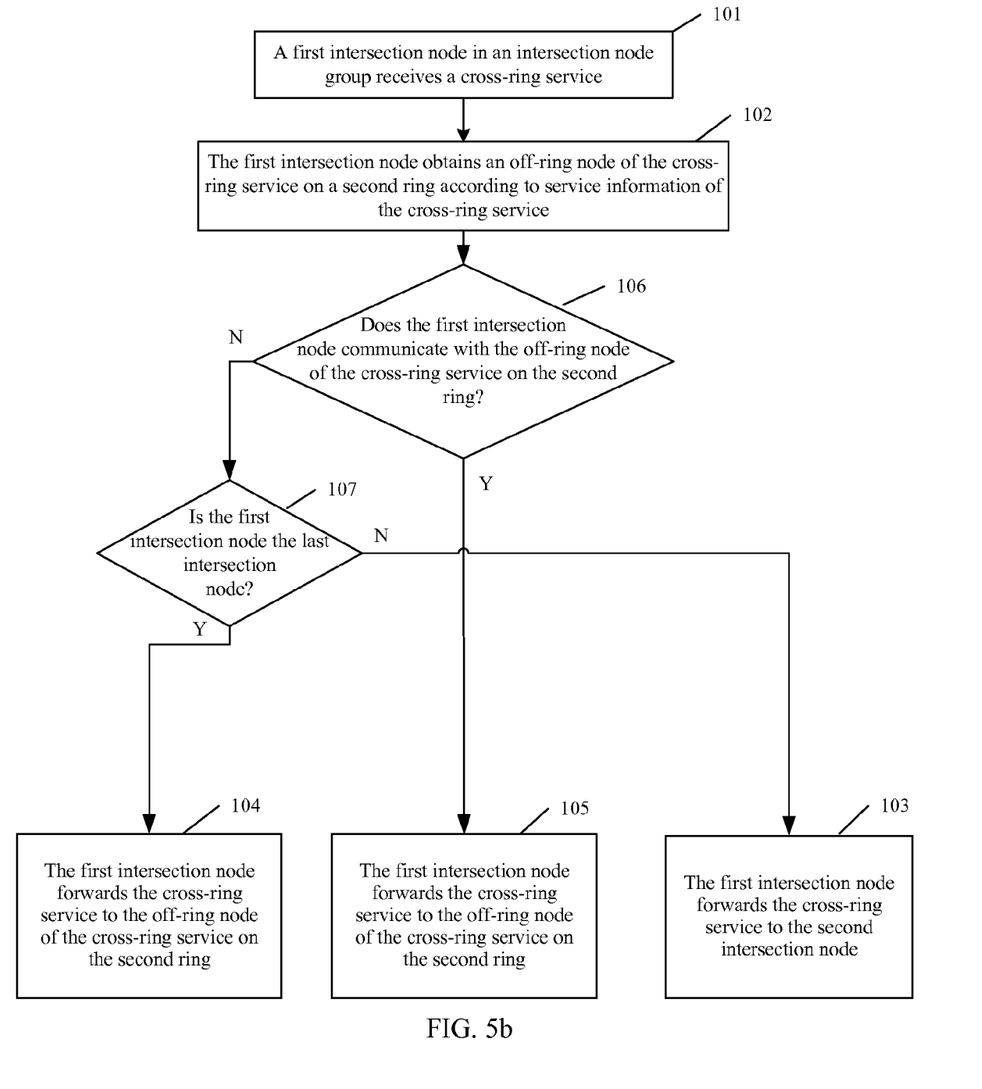

Optionally, as shown in FIGS. 5a and 6b, in another embodiment of the present application, before the above steps 103, 104 or 105, the method may further comprise:

106. The first intersection node determines whether the first intersection node communicates with the off-ring node of the cross-ring service on the second ring or not. For example, the first intersection node may obtain a fault state of the second ring according to an automatic protection switching message from the second ring, and determines whether the first intersection node communicates with the off-ring node of the cross-ring service on the second ring or not, according to the ring topology of the second ring.

107. The first intersection node determines whether the first intersection node is the last intersection node according to an incoming label of the cross-ring service or not. Optionally, the incoming label of the cross-ring service may be assigned according to the ring topology of the first ring and an on-ring node of the cross-ring service on the first ring. The incoming label may be used to indicate that the cross-ring service comes from the on-ring node of the cross-ring service on the first ring, also may be used to indicate that the first intersection node is the last intersection node.

In the embodiment of the present application, the executing sequence of 106 and 107 are not limited. In other words, 106 may be firstly executed and then 107 may be executed, 107 may be firstly executed and then 106 may be executed, or 106 and 107 may be simultaneously executed.

Optionally, in two intersection nodes closest to the on-ring node of the cross-ring service on the first ring, the service configurations of the cross-ring service are the same. In the embodiments of the present application, the "intersection nodes closest to the on-ring node of the cross-ring service on the first ring" refers to: two intersection nodes to which the cross-ring service firstly reaches along a work channel direction of the cross-ring service on the first ring and a protection channel direction of the cross-ring service, respectively, from the on-ring node of the cross-ring service on the first ring.

Optionally, the service configurations may comprise information such as the incoming label or the like. Further optionally, the service configurations may comprise other information, such as a source ring identifier (full name in English is: Identifier, hereinafter simply referred to as "ID") of a cross-ring service, a destination ring ID of the cross-ring service, an off-ring node of the cross-ring service on the next ring, and the like.

Optionally, in 101, the first intersection node receives the cross-ring service. Specifically, the first intersection node receives the cross-ring service via an inter-ring channel from the first ring to the second ring.

Optionally, the inter-ring channel is a LSP.

Optionally, the start point of the inter-ring channel from the first ring to the second ring is the on-ring node of the cross-ring service on the first ring, and the end point thereof is the intersection node group.

Optionally, the on-ring node on the first ring refers to the node from which the cross-ring service enters the first ring. Since the start point of the inter-ring channel from the first ring to the second ring is any one node on the first ring which receives the cross-ring service, each node in the first ring may establish an inter-ring channel for transmitting the cross-ring service. In an optional implementation of the present application, the intersection node group may be considered as a virtual intersection node, and any one intersection node in the intersection node group may be the end point of the above inter-ring channel.

By use of the interconnected ring protection method in the embodiments of the present application, when one intersection node in the intersection node group does not communicate with the off-ring node, the cross-ring service may be forwarded to another intersection node in the intersection node group, and an inter-ring operation is completed on the another intersection node. Thus, the protection of the interconnected ring may be realized without establishing an end-to-end protection tunnel for the cross-ring service and thereby reserving a protection bandwidth for the protection channel, so that the bandwidth utilization rate is improved.

The interconnected ring protection methods of the embodiments of the present application will be described in detail in connection with their specific application scenarios.

In the application scenario as shown in FIG. 6, the intersection node group of the first ring and the second ring comprises two intersection nodes: an intersection node F and an intersection node D. A certain service enters the first ring from a node B (entering the ring), departs from the first ring from the intersection node group of the first and second rings (exiting the ring), enters the second ring (entering the ring) and departs from the second ring on a node B1 (exit the ring) (hereinafter, the service is called as "cross-ring service").

In the embodiments of the present application, on the first ring, the on-ring node of the cross-ring service may set itself as a start point of an inter-ring channel, and the off-ring node (for example, the intersection node of the first ring and the second ring) as an end point of the inter-ring channel. Here, the inter-ring channel comprises a work channel and a protection channel. The directions of the work channel and the protection channel are opposite. If the work channel is in the clockwise direction, the protection channel is in the counter-clockwise direction, and vice versa. Similarly, on the second ring, an inter-ring channel may be established between the on-ring node and the off-ring node, and the inter-ring channel may also comprise a work channel and a protection channel. In the sequential examples, it is assumed that the direction of a work channel is in the clockwise direction, and the direction of a protection channel is in the counter-clockwise direction.

EXAMPLE 1

Figure 7:
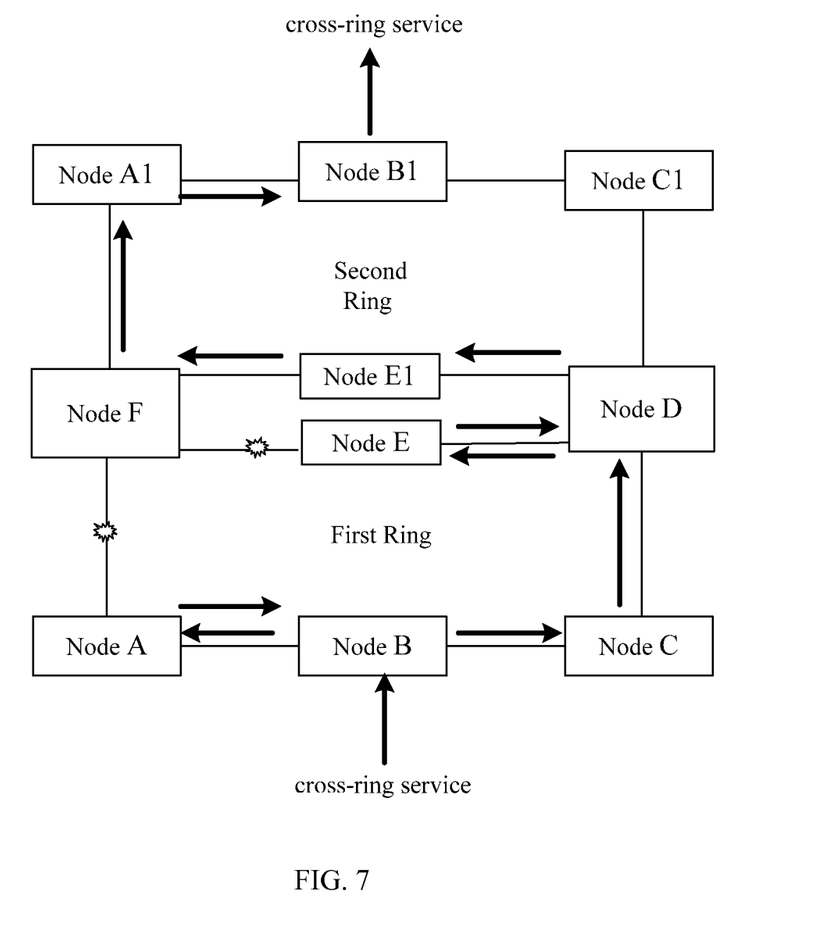

In this example, it is assumed that a fault occurs in the link between a node A and a node F, and the link between the node F and a node E. As shown in FIG. 7, a cross-ring service enters a first ring from a node B, and the node B forwards the cross-ring service to an intersection node group along the work channel of the inter-ring channel (clockwise direction). Since a fault occurs in the link between the node A and the node F, the inter-ring channel switches from the work channel to the protection channel on the node A (counter-clockwise direction), and the cross-ring service continues to be transmitted along the protection channel.

If the protection channel is wrapping (wrapping), the node A forwards the cross-ring service to the node E along the protection channel A→B→C→D→E. Since there is also a fault in the link between the node E and the node F, the inter-ring channel is again switched back to the work channel after the cross-ring service is transmitted to the node E, and the cross-ring service continues to be transmitted to the intersection node D along the work channel.

If the protection channel is not swapping, the cross-ring service is directly transmitted to the intersection node along the protection channel, i.e. A→B→C→D.

The intersection node D in the intersection node group determines that the cross-ring service is from the on-ring node according to the incoming label of the cross-ring service, and thereby the intersection node D is not the last intersection node. For example, the intersection nodes D and F may assign a label 100 to the cross-ring service. When the cross-ring service enters the first ring, the on-ring node B may attach the label 100 for the cross-ring service. When the intersection node D receives the cross-ring service, and the incoming label is 100, it is determined that the cross-ring service is from the on-ring node.

The intersection node D determines that the off-ring node of the cross-ring service on the second ring is the node B1 according to the service information of cross-ring service, and judges whether the intersection node D communicates with the off-ring node B1 or not. If the intersection node D communicates with the off-ring node B1, the intersection node D forwards the cross-ring service to the off-ring node B1.

As shown in FIG. 7, on the second ring, the intersection node D forwards the cross-ring service to the node B1 along the work channel D→E1→F→A1→B1.

EXAMPLE 2

Figure 8:
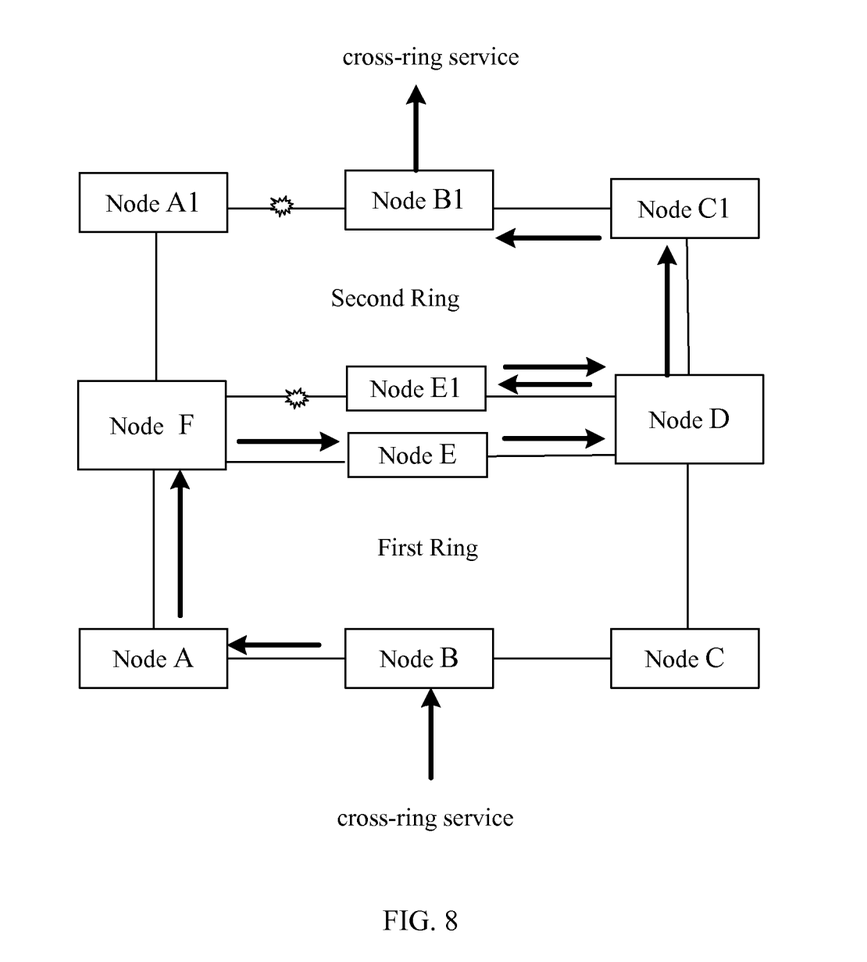

As shown in FIG. 8, it is assumed that a fault occurs in the link between a node A1 and a node B1, and the link between the node E1 and a node F.

A cross-ring service enters a first ring from a node B, and is transmitted to the intersection node F along a work channel B→A→F of the inter-ring channel.

The intersection node F determines that the cross-ring service is from an on-ring node according to an incoming label of the cross-ring service. Thus, the intersection node F determines that the off-ring node of the cross-ring service on the second ring is the node B1 according to the service information of cross-ring service, after receiving the cross-ring service; the intersection node F obtains a fault state of the second ring according to a received automatic protection switching message of the second ring, judges whether the intersection node F communicates with the off-ring node of the cross-ring service on the second ring or not, according to the ring topology of the second ring; and in this example, since a fault occurs in the link between the node A1 and the node B1, and the link between the node E1 and the node F, the intersection node F does not communicate with the off-ring node B1. Thus, the intersection node F modifies an outgoing label of the cross-ring service, and then forwards the cross-ring service to another intersection node D in the intersection node group along a work channel F→E→D.

The intersection node D determines that the cross-ring service is from another intersection node F in the intersection node group according to the incoming label of the cross-ring service (i.e. an outgoing label when the cross-ring service is transmitted from the intersection node F), and thereby the intersection node D is the last intersection node. For example, the intersection node D may assign a label 101 to the cross-ring service, and may modify the outgoing label of the cross-ring service into the label 101 assigned by the intersection node D when the intersection node F does not communicate with the off-ring node B1, and then forwards the cross-ring service to the intersection node D. When the intersection node D receives the cross-ring service, and the incoming label is 101, it is determined that the cross-ring service is from other intersection nodes, and the intersection node D itself is the last intersection node.

The intersection node D determines that the off-ring node of the cross-ring service on the second ring is the node B1 according to the service information of the cross-ring service, after receiving the cross-ring service, and directly forwards the cross-ring service to the lower ring node B1.

In the second ring, the intersection node D transmits the cross-ring service along the work channel. Since a fault occurs in the link between the node E1 and the node F, the inter-ring channel is switched to the protection channel after the cross-ring service is transmitted to the node E1, and the cross-ring service continues to be transmitted along the protection channel.

EXAMPLE 3

Figure 9:
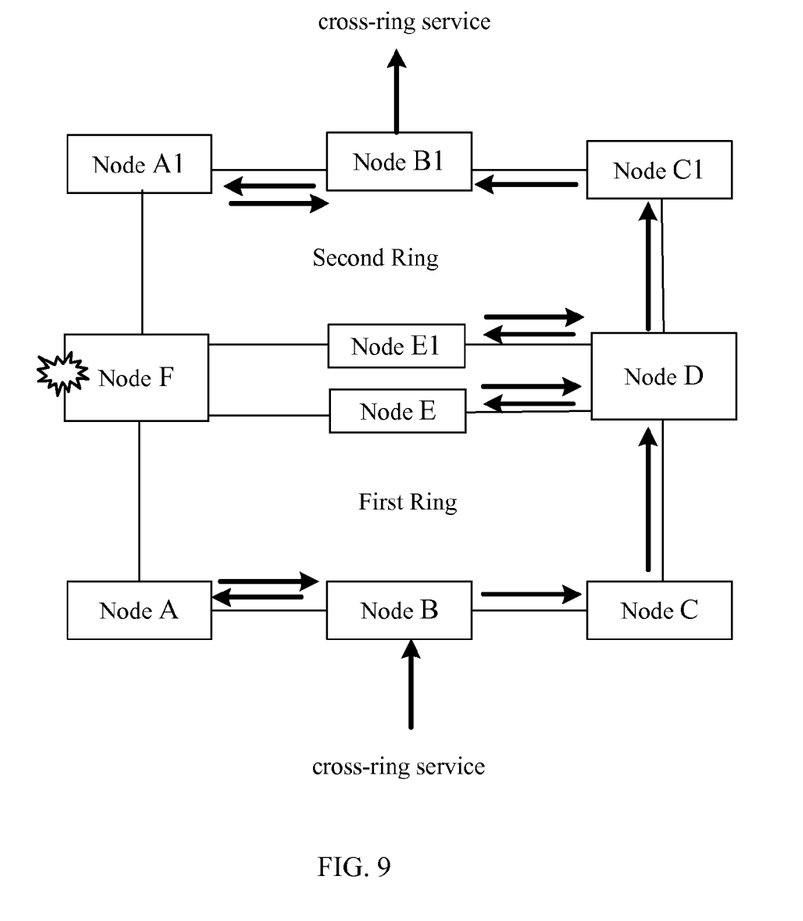

As shown in FIG. 9, it is assumed that a fault occurs in the intersection node F.

The cross-ring service enters the first ring on the node B, and the node B forwards the cross-ring service to an intersection node group along a work channel of an inter-ring channel. As shown in FIG. 9, since a fault occurs in the intersection node F, the intersection node F is not reachable, and thereby the inter-ring channel is switched into a protection channel after the cross-ring service is transmitted to the node A, and the cross-ring service continues to be transmitted to another intersection node D in the intersection node group along the protection channel.

The intersection node D determines that the cross-ring service is from the on-ring node according to an incoming label of the cross-ring service and the intersection node D is not the last intersection node, therefore the intersection node D determines that the off-ring node of the cross-ring service on the second ring is the node B1 according to the service information of the cross-ring service after the intersection node D receives the cross-ring service. The intersection node D determines that the intersection node D communicates with the off-ring node B1 by judging, and therefore the intersection node D forwards the cross-ring service to the off-ring node B1.

Figure 10:
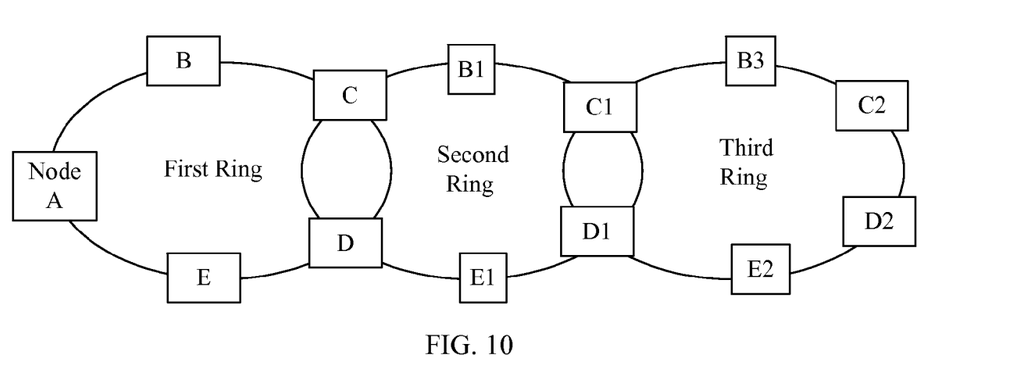
FIG. 10 is a schematic diagram of a structure of three rings in series interconnection.

For the sake of simplification, the embodiments of the present application and their applications are described by taking the case of two-ring intersection as an example. However, it can be understood by a person skilled in the art that the schemes provided in the embodiments of the present application may also be applied in the cases of multi-ring intersection, comprising the case of multiple rings interconnection in series, the case of a plurality of rings intersecting on the same node, and the like. For example, the case of three rings interconnection in series is shown in FIG. 10, wherein the cross-ring service enters the first ring from the node A, passes through the second ring, and finally departs from the third ring from the node B3. In the case, when the cross-ring service is forwarded to the second ring via the intersection node C or D, it can be understood that this is the case of two-ring intersection. When the cross-ring service is forwarded to the third ring via the intersection node C1 or D1 from the second ring, it can be understood that this is also the case of two-ring intersection.

In the practical processing, for example, other cases of multi-ring intersection, for example, that one ring intersects with a plurality of rings at the same time, may also be understood as a plurality of two-ring intersections, the processing steps are substantially similar to those described above, and are not repeatedly described herein.

Figure 11:
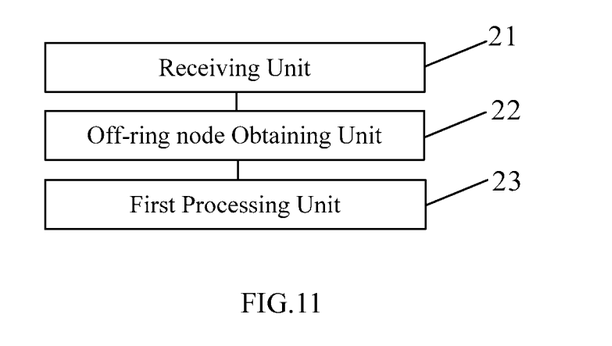
FIGS. 11 to 14 are schematic diagrams of the structures of interconnected ring protection apparatuses provided by the embodiments of the present application.

The embodiments of the present application further provide an interconnected ring protection apparatus. The interconnected ring protection apparatus is an intersection node of a first ring and a second ring. As shown in FIG. 11, the interconnected ring protection apparatus comprises:

a receiving unit 21, configured to receive a cross-ring service;

an off-ring node determining unit 22, configured to determine an off-ring node of the cross-ring service on a second ring according to service information of the cross-ring service; and a first processing unit 23, configured to forward the cross-ring service to another intersection node of the first ring and the second ring, if the interconnected ring protection apparatus does not communicate with the off-ring node of the cross-ring service on the second ring, and the interconnected ring protection apparatus is not the last intersection node.

Figure 12:
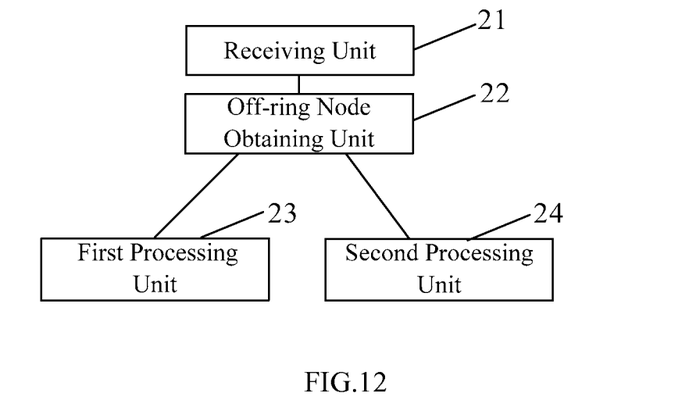

Optionally, as shown in FIG. 12, the interconnected ring protection apparatus may further comprise:

a second processing unit 24, configured to forward the cross-ring service to the off-ring node of the cross-ring service on the second ring, if the interconnected ring protection apparatus is the last intersection node.

Figure 13:
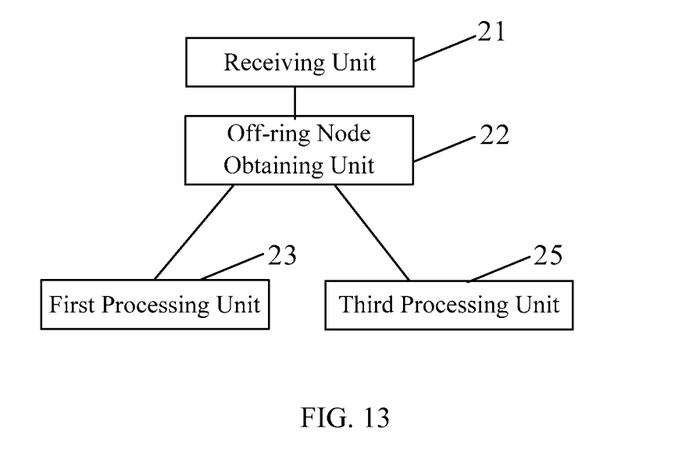

Optionally, as shown in FIG. 13, the interconnected ring protection apparatus may further comprise:

a third processing unit 25, configured to forward the cross-ring service to the off-ring node of the cross-ring service on the second ring, if the interconnected ring protection apparatus communicates with the off-ring node of the cross-ring service on the second ring.

Figure 14:
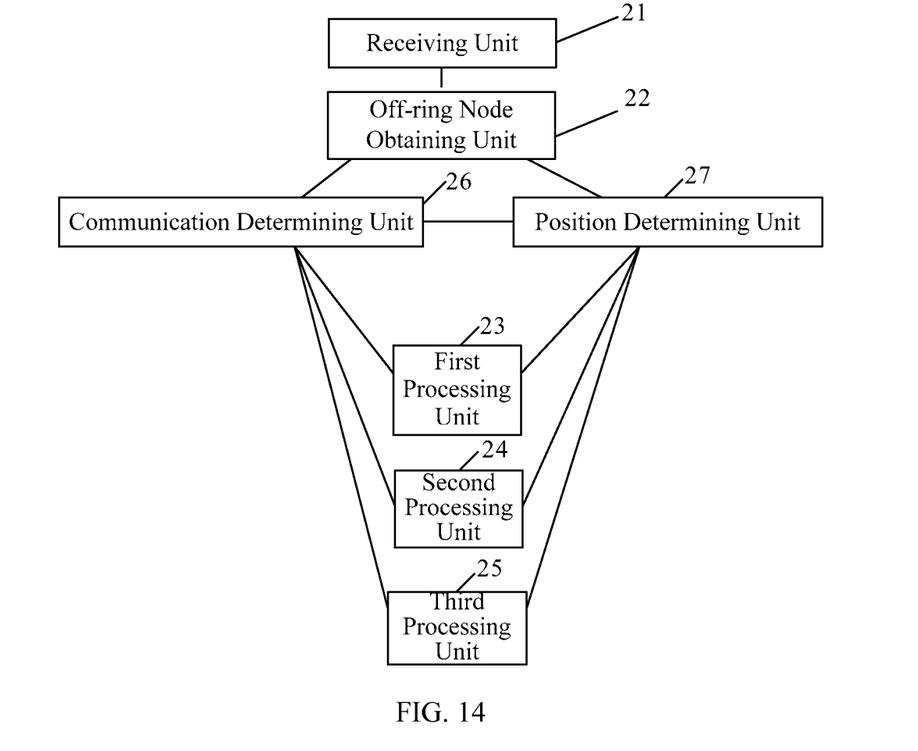

Optionally, as shown in FIG. 14, the interconnected ring protection apparatus may further comprise:

a communication determining unit 26, configured to determine whether the interconnected ring protection apparatus communicates with the off-ring node of the cross-ring service on the second ring or not; and/or a position determining unit 27, configured to determine whether the interconnected ring protection apparatus is the last intersection node or not, according to an incoming label carried by the cross-ring service.

Optionally, the interconnected ring protection apparatus provided by this embodiment performs the interconnected ring protection method provided by any one of the embodiments in FIGS. 2 to 5b, and similar features is not repeatedly described herein.

By use of the interconnected ring protection method in the embodiments of the present application, when the interconnected ring protection apparatus does not communicate with the off-ring node, the cross-ring service may be forwarded to another intersection node in the intersection node group, and the inter-ring operation is completed on the another intersection node. Thus, the protection of the interconnected ring may be realized without establishing an end-to-end protection tunnel for the cross-ring service and thereby reserving a protection bandwidth for the protection channel, so that the bandwidth utilization rate is improved.

Figure 15:
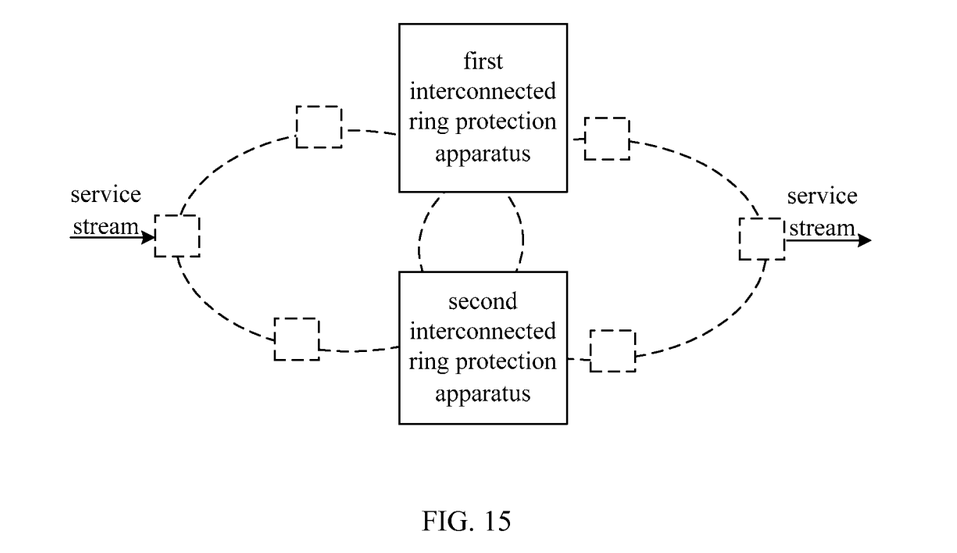
FIG. 15 is a schematic diagram of an interconnected ring protection system by an embodiment of the present application.

The embodiments of the present application further provide an interconnected ring protection system, as shown in FIG. 15, comprising at least one first interconnected ring protection apparatus and one second interconnected ring protection apparatus. Where the first interconnected ring protection apparatus and the second interconnected ring protection apparatus are intersection nodes of a first ring and a second ring, and the second interconnected ring protection apparatus is the last intersection node.

Specially, the first interconnected ring protection apparatus is configured to receive an cross-ring service, determine an off-ring node of the cross-ring service on the second ring according to service information of the cross-ring service, forward the cross-ring service to the off-ring node of the cross-ring service on the second ring if the first interconnected ring protection apparatus communicates with the off-ring node of the cross-ring service on the second ring, and forward the cross-ring service to other intersection nodes of the first and second rings if the first interconnected ring protection apparatus does not communicate with the off-ring node of the cross-ring service on the second ring.

the second interconnected ring protection apparatus is configured to receive the cross-ring service from the first interconnected ring protection apparatus, obtain the off-ring node of the cross-ring service on the second ring according to the service information of the cross-ring service, and forward the cross-ring service to the off-ring node of the cross-ring service on the second ring.

By use of the interconnected ring protection system in the embodiments of the present application, when the interconnected ring protection apparatus does not communicate with the off-ring node, the cross-ring service may be forwarded to another intersection node in the intersection node group, and the inter-ring operation is completed on the another intersection node. Thus, the protection of the interconnected ring can be realized without establishing an end-to-end protection tunnel for the cross-ring service and thereby reserving a protection bandwidth for the protection channel, so that the bandwidth utilization rate is improved.

By the above description of the embodiments, it can be apparent to a person skilled in the art that the present application may be implemented by software in addition to necessary general-purpose hardware, and of course, may be implemented by hardware. However, in most of cases, the former is the better. Based on this understanding, the part of the technical solutions of the present application which contributes to the present application over the prior art may be embodied in a form of a computer software product, and the computer software product is stored in a readable storage medium such as a floppy disc, a hard disc, an optical disc or the like of the computer, and contains various instructions for causing a computer apparatus (which may be a personal computer, a server, a network apparatus, or the like) to execute the methods of individual embodiments of the present application.

The above description is only specific implementations of the present application, and the protection scope of the present application is not limited to this. Any one person skilled in the art can easily conceive of changes or alterations within the technical scope disclosed by the present application, and they should be contained in the protection scope of the present application. Thus, the protection scope of the present application should be defined by the claims.

What is claimed is:

1. An interconnected ring protection method, comprising:
receiving, by a first intersection node in an intersection node group, a cross-ring service, wherein the intersection node group comprises at least the first intersection node and a second intersection node, and the first intersection node and the second intersection node are intersection nodes of a first ring and a second ring;
determining, by the first intersection node, an off-ring node of the cross-ring service on the second ring, according to service information of the cross-ring service; and
if the first intersection node does not communicate with the off-ring node of the cross-ring service on the second ring, and the first intersection node is not the last intersection node, forwarding, by the first intersection node, the cross-ring service to the second intersection node.

2. The method of claim 1, further comprising:
forwarding, by the first intersection node, the cross-ring service to the off-ring node of the cross-ring service on the second ring if the first intersection node is the last intersection node.

3. The method of claim 2, wherein the first intersection node forwarding the cross-ring service to the off-ring node of the cross-ring service on the second ring if the first intersection node is the last intersection node comprises:
if the first intersection node is the last intersection node, and the first intersection node does not communicate with the off-ring node of the cross-ring service on the second ring, forwarding, by the first intersection node, the cross-ring service to the off-ring node of the cross-ring service on the second ring, without considering whether the cross-ring service finally reaches the off-ring node of the cross-ring service on the second ring.

4. The method of claim 1, further comprising:
forwarding, by the first intersection node, the cross-ring service to the off-ring node of the cross-ring service on the second ring, if the first intersection node communicates with the off-ring node of the cross-ring service on the second ring.

5. The method of claim 1, wherein, before the first intersection node forwarding the cross-ring service to the second intersection node, the method further comprises:
determining, by the first intersection node, whether the first intersection node communicates with the off-ring node of the cross-ring service on the second ring.

6. The method of claim 5, wherein the first intersection node determining whether the first intersection node communicates with the off-ring node of the cross-ring service on the second ring comprises:
obtaining, by the first intersection node, a fault state of the second ring according to an automatic protection switching message from the second ring, and determining whether the first intersection node communicates with the off-ring node of the cross-ring service on the second ring, according to a ring topology of the second ring.

7. The method of claim 1, wherein, before the first intersection node forwarding the cross-ring service to the second intersection node, the method further comprises:
determining, by the first intersection node, whether the first intersection node is the last intersection node, according to an incoming label of the cross-ring service.

8. The method of claim 1, wherein the first intersection node in the intersection node group receiving the cross-ring service comprises:
receiving, by the first intersection node, the cross-ring service through an inter-ring channel from the first ring to the second ring.

9. The method of claim 8, wherein the inter-ring channel is a label switching path (LSP).

10. The method of claim 8, wherein a starting point of the inter-ring channel is an on-ring node of the cross-ring service on the first ring, and an end point of the inter-ring channel is the intersection node group.

11. The method of claim 1, wherein service configurations of the cross-ring service are the same in two intersection nodes closest to an on-ring node of the cross-ring service on the first ring.

12. The method of claim 11, wherein the service configurations of the cross-ring service are incoming labels of the cross-ring service.

13. An interconnected ring protection apparatus, which is an intersection node of a first ring and a second ring, comprising,
a receiving unit, configured to receive a cross-ring service;
an off-ring node determining unit comprising a circuitry, configured to determine an off-ring node of the cross-ring service on the second ring according to service information of the cross-ring service; and
a first processing unit, configured to forward the cross-ring service to another intersection node of the first ring and the second ring, if the interconnected ring protection apparatus does not communicate with the off-ring node of the cross-ring service on the second ring, and the interconnected ring protection apparatus is not the last intersection node.

14. The apparatus of claim 13, further comprising:
a second processing unit, configured to forward the cross-ring service to the off-ring node of the cross-ring service on the second ring, if the interconnected ring protection apparatus is the last intersection node.

15. The apparatus of claim 13, further comprising:
a third processing unit, configured to forward the cross-ring service to the off-ring node of the cross-ring service on the second ring, if the interconnected ring protection apparatus communicates with the off-ring node of the cross-ring service on the second ring.

16. The apparatus of claim 13, further comprising:
a communication determining unit comprising a circuitry, configured to determine whether the interconnected ring protection apparatus communicates with the off-ring node of the cross-ring service on the second ring.

17. The apparatus of claim 13, further comprising:
a position determining unit comprising a circuitry, configured to determine whether the interconnected ring protection apparatus is the last intersection node, according to an incoming label carried in the cross-ring service.

18. The method of claim 1, wherein, before the first intersection node forwarding the cross-ring service to the off-ring node of the cross-ring service on the second ring, the method further comprises:
determining, by the first intersection node whether the first intersection node communicates with the off-ring node of the cross-ring service on the second ring.

19. The method of claim 1, wherein, before the first intersection node forwarding the cross-ring service to the off-ring node of the cross-ring service on the second ring, the method further comprises:
determining, by the first intersection node whether the first intersection node is the last intersection node, according to an incoming label of the cross-ring service.

20. An interconnected ring protection system, comprising at least one first interconnected ring protection apparatus and one second interconnected ring protection apparatus, where the first interconnected ring protection apparatus and the second interconnected ring protection apparatus are intersection nodes of a first ring and a second ring, and the second interconnected ring protection apparatus is the last intersection node, wherein the first interconnected ring protection apparatus comprising a circuitry, is configured to receive a cross-ring service;

determine an off-ring node of the cross-ring service on the second ring, according to service information of the cross-ring service;

forward the cross-ring service to the off-ring node of the cross-ring service on the second ring, if the first interconnected ring protection apparatus communicates with the off-ring node of the cross-ring service on the second ring; and forward the cross-ring service to other intersection nodes of the first and second rings if the first interconnected ring protection apparatus does not communicate with the off-ring node of the cross-ring service on the second ring; and the second interconnected ring protection apparatus comprising a circuitry, is configured to receive the cross-ring service from the first interconnected ring protection apparatus;

obtain the off-ring node of the cross-ring service on the second ring, according to the service information of the cross-ring service; and forward the cross-ring service to the off-ring node of the cross-ring service on the second ring.

\* \* \* \* \*